US 10,766,397 B2

(12) United States Patent
Wieth

(10) Patent No.: US 10,766,397 B2
(45) Date of Patent: Sep. 8, 2020

(54) MOTORHOME

(71) Applicant: ProTec GmbH & Co. KG, Wessling (DE)

(72) Inventor: Franz Wieth, Feldafing (DE)

(73) Assignee: PROTEC GMBH & CO. KG, Wessling (DE)

(*) Notice: Subject to any disclaimer, the term of this patent is extended or adjusted under 35 U.S.C. 154(b) by 32 days.

(21) Appl. No.: 16/062,219

(22) PCT Filed: Dec. 15, 2016

(86) PCT No.: PCT/EP2016/081322
§ 371 (c)(1),
(2) Date: Jun. 14, 2018

(87) PCT Pub. No.: WO2017/103031
PCT Pub. Date: Jun. 22, 2017

(65) Prior Publication Data
US 2018/0370413 A1 Dec. 27, 2018

(30) Foreign Application Priority Data
Dec. 15, 2015 (DE) .................. 10 2015 225 269

(51) Int. Cl.
B60P 3/34 (2006.01)
(52) U.S. Cl.
CPC ..................... B60P 3/34 (2013.01)
(58) Field of Classification Search
CPC ....................................... B60P 3/34
See application file for complete search history.

(56) References Cited

U.S. PATENT DOCUMENTS

| 5,090,749 | A | 2/1992 | Lee |
| 5,785,373 | A | 7/1998 | Futrell et al. |
| 5,800,002 | A | 9/1998 | Tiedge et al. |
| 6,098,346 | A | 8/2000 | Miller et al. |
| 6,293,612 | B1 | 9/2001 | Crean |
| 2004/0017096 | A1 | 1/2004 | Crean |
| 2004/0150240 | A1 | 8/2004 | Koren |
| 2004/0256874 | A1 | 12/2004 | Rex |
| 2005/0189785 | A1 | 9/2005 | Harder |
| 2005/0230990 | A1 | 10/2005 | Rincoe |
| 2006/0267363 | A1 | 11/2006 | Crean et al. |
| 2008/0018130 | A1 | 1/2008 | Kunz et al. |

(Continued)

FOREIGN PATENT DOCUMENTS

| AU | 2007216838 A1 | 4/2008 |
| DE | 31 22 858 A1 | 12/1982 |

Primary Examiner — D Glenn Dayoan
Assistant Examiner — Melissa Ann Bonifazi
(74) Attorney, Agent, or Firm — Baker & Hostetler LLP

(57) ABSTRACT

A motorhome is provided a vehicle longitudinal axis and a superstructure with furnishing that is arranged on the vehicle chassis and extends in the vehicle longitudinal axis, wherein the superstructure has at least one space expansion module that displaceably attached transverse to the vehicle longitudinal axis and extends at least approximately along a length of the at least 0.8-fold of the entire length of the superstructure. Here, at least four drives for moving the at least one space expansion module transverse to the vehicle longitudinal axis are arranged on the superstructure and/or on a space expansion module, wherein the at least one space expansion module is connected to the superstructure via at least four guiding elements each.

15 Claims, 9 Drawing Sheets

(56) References Cited

U.S. PATENT DOCUMENTS

| | | |
|---|---|---|
| 2008/0100094 A1 | 5/2008 | MacLean |
| 2009/0134663 A1 | 5/2009 | Hickam et al. |
| 2011/0025091 A1 | 2/2011 | Schwindaman et al. |
| 2012/0035813 A1 | 2/2012 | Kreil |
| 2012/0150394 A1 | 6/2012 | Schwindaman et al. |
| 2014/0138976 A1 | 5/2014 | Revelino et al. |

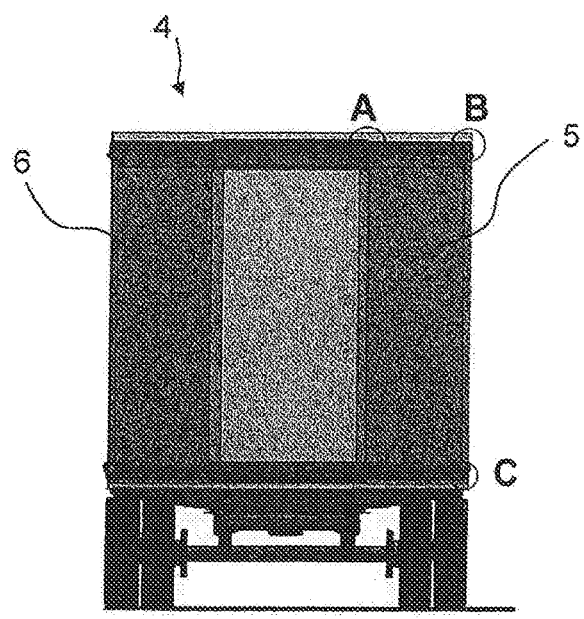
FIG. 9.1
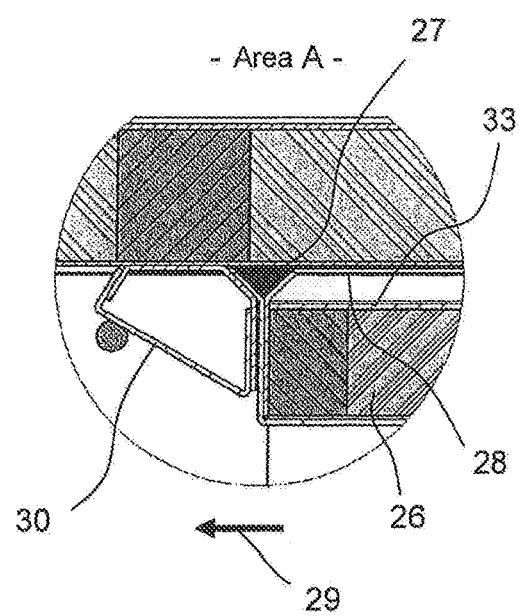
FIG. 9.2
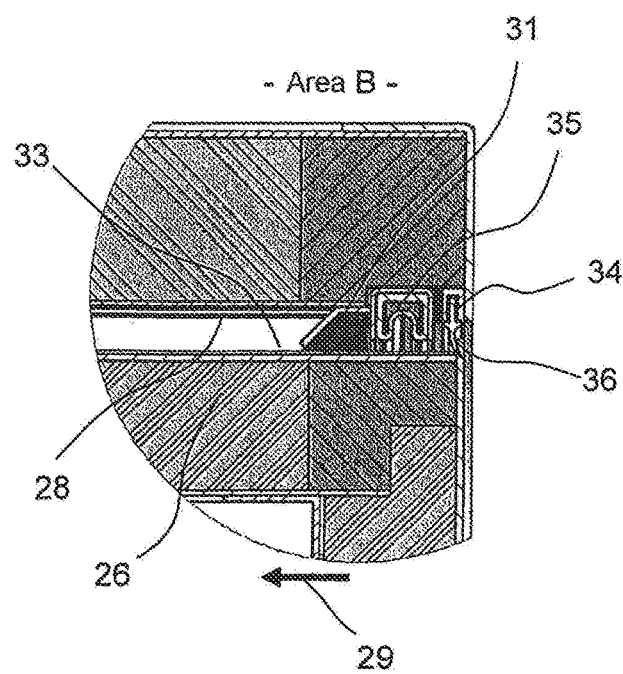
FIG. 9.3
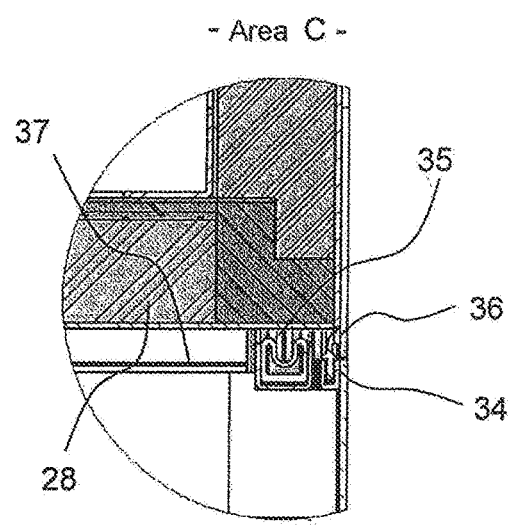
FIG. 9.4

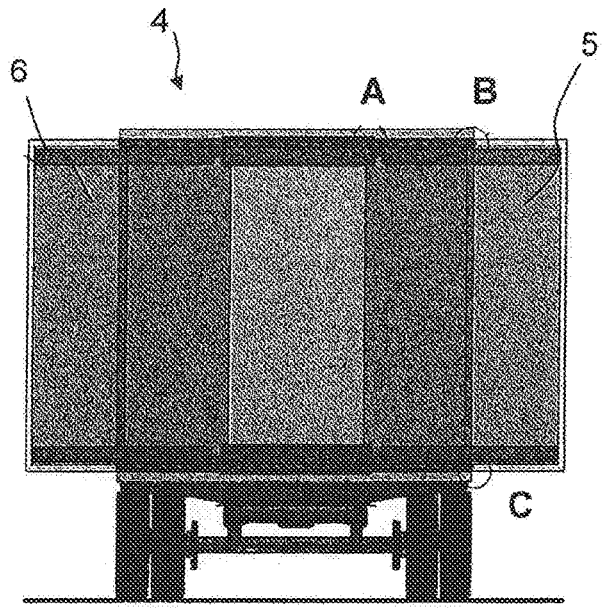
FIG. 10.1
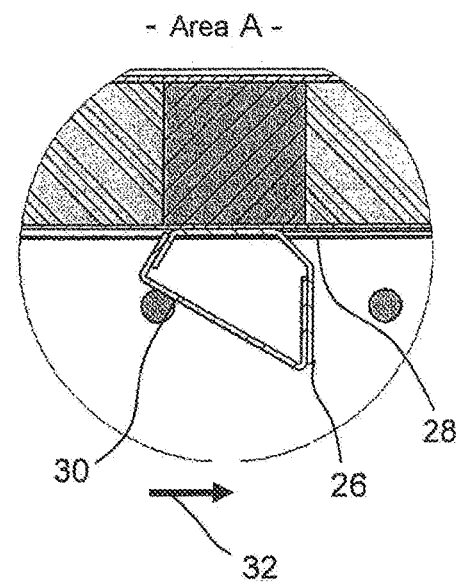
FIG. 10.2
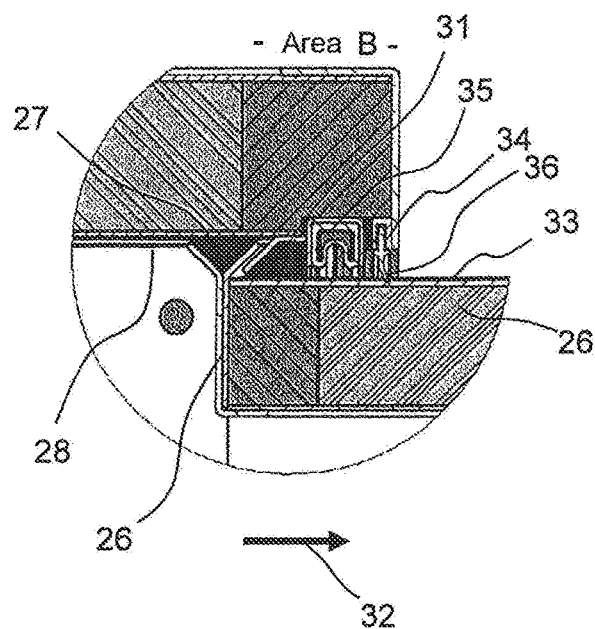
FIG. 10.3
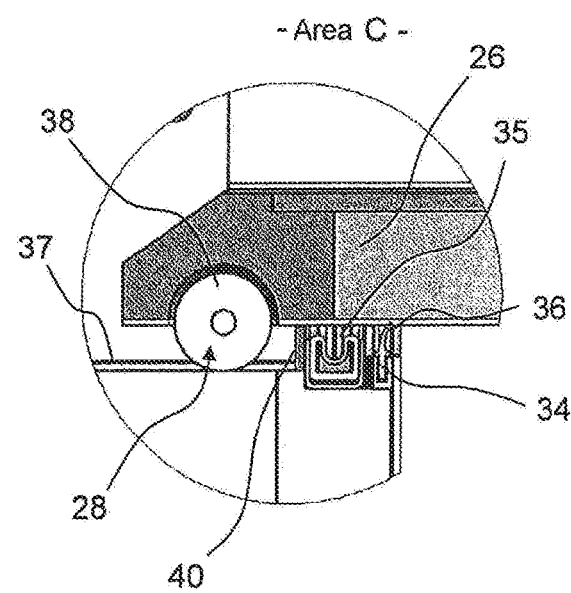
FIG. 10.4

MOTORHOME

CROSS-REFERENCE TO RELATED APPLICATIONS

This application is a National Stage of International patent application PCT/EP2016/081322, filed on Dec. 15, 2016, which claims priority to foreign German patent application No. 10 2015 225 269.8, filed on Dec. 15, 2015, the disclosures of which are incorporated by reference in their entirety.

FIELD OF THE INVENTION

The present invention relates to a motorhome having a vehicle longitudinal axis and a superstructure that is arranged on a vehicle chassis and extends with the vehicle longitudinal axis and has at least one space expansion module that is displaceably attached to the superstructure transverse to the vehicle longitudinal axis and extends at least approximately over the entire length and height of a longitudinal side of the superstructure. A measure that extends at least approximately over the entire length in the meaning of the application is given for example when the length of the space expansion module corresponds to at least the 0.8-fold of the entire length of the superstructure. The same applies to the height.

BACKGROUND

Such motorhomes are known per se. In the meaning of the present invention motorhomes are meant to be motorized vehicles such as for example mobile homes or caravans, but also non-motorized vehicles such as for example trailers and house trailers, respectively. Here, it doesn't basically matter for which purpose the motorhomes are employed. It is only important that they have a superstructure that puts up an interior that is suitable for the permanent residence of persons. It doesn't basically matter for the significance of the invention whether the motorhome is employed for long travels or very short travels—for example in a city. Accordingly, the invention explicitly relates to vehicles that are employed for tourism purposes, since here the benefit of the invention takes effect to a significantly large extent. However, the invention also makes sense in motorhomes that are used in the non-tourism use such as for example the building and showman trade, delivery vehicles, e.g. for traveling food shops, or also for the use for medical application purposes, for example a medical blood transfusion service. It is also conceivably to use the motorhomes according to the invention as mobile operation centers, especially for military or police operations.

The term vehicle longitudinal axis in this context has to be understood as the axis extending substantially through the front end and the rear end of the motorhome, preferably through the center of the front end and the center of the rear end. That is, the longitudinal axis extends in parallel to the traveling direction in which the motorhome is typically moved.

All the motorhomes have in common that the usable interior of the superstructure of the motorhome is significantly smaller and more limited compared with immobile common, living and/or working space. Thus, the prior art for increasing the interior proposes lateral space expansion modules with a drawer-like working principle arranged on the superstructure. These space expansion modules also referred to as slideouts offer the opportunity to increase the space of the superstructure of the motorhome by laterally sliding out a part of the space that is generally laterally open toward the vehicle longitudinal axis. That is, such slideouts often have three walls, a floor and a roof.

In order to allow the greatest possible gain in space it seems to be obvious to use space expansion modules that should extend over the entire length of the superstructure. However, in practice, such solutions have only rarely been realized because of concerns regarding the drives or the statics. Because, such large slideouts are very heavy and already with small slideouts nowadays there are found large and voluminous drives that significantly impair the usability of the motorhome. So, until today on the market there are virtually found only motorhomes with space expansion modules the width of which is significantly smaller than the length of the superstructure. If a lot of space is to be gained then several of such smaller space expansion modules are arranged along the relevant side of the superstructure, e.g. on the right and on the left of the entry to the superstructure of the motorhome.

Thus, the known motorhomes still are not usable as satisfactory as is desired in view of immobile usable space. Because, especially the stationary areas of the sides of the superstructure between the slideouts disturb the usability of the motorhome.

SUMMARY OF THE INVENTION

Against this background it is the object of the present invention to create a motorhome that is even better usable than the known generic motorhomes with at least one space expansion module available on the market.

This problem is solved with a motorhome according to claim 1. Advantageous developments of the invention are described in the sub-claims.

That is, the motorhome according to the invention over the initially described motorhomes is characterized in that at least four drives for moving the at least one space expansion module transverse to the vehicle longitudinal axis are arranged on the superstructure and/or on a space expansion module. Here, the at least one space expansion module is displaceably connected to the superstructure via at least four guiding elements each.

It is especially advantageous to use at least four drives and at least four guiding elements that are preferably attached to the superstructure in the corners of the space expansion module or opposite to those, respectively, because in this way relatively small drives and relatively small guiding elements can be used that thus disturb only a little. At the same time, they allow moving the space expansion module in a particularly safe manner, since tilting of the space expansion module can reliably be prevented by driving via four areas.

In a development, at least two drives and guiding elements each are arranged in the floor area and at least two drives and guiding elements each are arranged on top of the front and rear wall, respectively. However, by dividing in four drives it has been shown that the drives in total become smaller and lighter which makes it possible to firmly fix them in the front and rear wall. Additionally, the superstructures and their components in the meantime can also be reinforced by means of appropriate foams so that disturbing supporting structures can be avoided to which the drives have to be attached.

Suitably, the drives are electronically synchronized and preferably have a load-controlled emergency cut-out. The electric synchronization typically is performed by means of a control that controls the movements of the individual drives such that the space expansion module moves evenly. For that, the control in the best case can also regulate the rotational speeds of the drives, for example. By the electronic synchronization expensive and also heavy synchronized gearboxes are omitted. This further helps in decreasing the size of the overall drive technology that is found to be irritating and in displacing the drives to the upper wall area of the front and rear wall and preferably to the upper and lower corner areas of the superstructure and the space expansion modules where they disturb less, simply because of the position on the outskirts.

As drives there can be used mechanically but also hydraulically, pneumatically or electrically driven drives. Preferably, at least one drive is configured as a spindle drive. The use of a spindle drive has the advantage that it requires little installation space and enables an effective transduction of a rotatory movement of a drive shaft, for example an electric motor, into a translatory movement for laterally displacement of the space expansion modules. A further particular advantage of spindle drives is the high holding forces that can be absorbed in the direction of the spindle longitudinal axis. Independent of the deflection position of the spindle drive thus, it can be ensured that such forces can be transferred via the toothing of the spindle drive without a relative motion between spindle and the stationary part of the drive being ensued. This is particularly advantageous with high loadings of the space expansion modules. Further, the drive by taking into account the holding force (friction) of the pneumatic sealing acting in the respective end position of the slideouts can arrest the retracted space expansion modules in the stationary part of the superstructure without an additional locking device. By the high holding force also very high acceleration forces as could occur with extreme cornering can safely be absorbed. All in all, the space expansion modules with spindle drives are simply, unambiguously, and safely locked in the stationary part of the superstructure.

In a further development, the drives assigned to a space expansion module have a driving power that in total is at most as large that the movement of the space expansion module can be performed manually, preferably using a mechanical emergency actuation aid. Here, the force should comply with that of an ordinary user of the motorhome and the seal between the superstructure and the space expansion module should not be put under pressure. Then, it is ensured that even if the drive fails, the at least one space expansion module can still be displaced. This is of great importance especially in case of a failure in the extended state. Because only in this way it is ensured that also in case of a failure of the drive technology of the at least one space expansion module the motorhome can still safely be moved on the street.

Preferably, the guiding element each has a guide rail with a slide moveably attached thereto and a holding blade attached to the slide. Here, a holding blade is meant to be a narrow oblong member or a corresponding structure. So, the guiding element is less broad and can be mounted very space-saving, preferably very far into the corners of the space expansion module.

Here, at least one, preferably all guide rails is/are directly attached to a ceiling, a wall, and/or a floor of the superstructure. Because, not least also by the already mentioned measures the drives and guiding elements can be built very small and light. Moreover, in the meantime very solid foams are available with which superstructures can be reinforced so that the previously customary space-wasting and heavy supporting structures can be omitted.

Here, it is of advantage if at least one, preferably all holding blades is/are directly attached to a ceiling, a wall, and/or a floor of a space expansion module (5, 6). Here applies, what has already been said about the guide rails.

In a further development, a foamed plastic of increased strength is arranged in the concerned ceiling, wall, and/or floor of the superstructure and/or of the space expansion module in the area of attachment of the guide rail and/or of the holding blade. This means that only the attachment areas can be specifically equipped with these foams, which also saves weight and costs.

Sensibly, at least one slide has at least two rolling members via which it is connected to the guide rail. This is advantageous in that large forces can be transferred and still low friction is generated.

Here, the slide and the holding blade can be connected by interposing at least one adjusting means, preferably an eccentric. In this way, inaccuracies of the superstructure or of the at least one space expansion module can be compensated when mounting the holding blades or the guide rails.

It is particularly preferred for the at least one holding blade to have a throw. Therefore, several holding blades can be mounted in the particularly stable corner areas with opposing space expansion modules. Also, in this way the blades can be arranged overlapping in the length in separate guide rails for better guiding and load absorption. So, the holding blade at best can be set flush in the corner of a space expansion module and then, the guide rail laterally and/or in terms of height offset thereto. This results in a further reduction of disturbing fittings. Moreover, in this way the guiding element is attached in a particularly stable part of the space expansion module in which already reinforcing foams are provided. This, again saves weight and costs.

According to the invention at least one force application means absorbing tensile and/or compressive forces is provided on the superstructure and on at least one space expansion module for applying the force of a mechanical emergency actuation means, especially a tension-compression device. This can be a device similar to a brace, a jack, or a block and tackle.

Advantageously, a space expansion module is slidably connected to the superstructure via at least two guiding elements. These could be for example two telescoping rails among which one rail is attached to the stationary part of the superstructure and the other to the movable space expansion module. Especially by telescoping guiding elements a particularly space-saving attachment of the space expansion module is obtained.

Moreover, it is suitable that the drive and the guiding elements each are combined in one assembly. Such assemblies are easy to install.

Advantageously, the assembly is preferably arranged in the interior of the stationary part of the superstructure and/or at least one space expansion module. This serves for shielding the assembly against environmental influences.

Here it could also be of advantage if a part of the furnishing in the superstructure of the at least one space expansion module is arranged such that at least a quarter, preferably a third of the gross volume of the furnishing of the superstructure is attached to the at least one space expansion module.

The term furnishing is broad to understand here. In the meaning of the invention this shall include all what is arranged in the superstructure and attached there for permanent whereabouts. That is, these are especially all fittings that do not contribute to shroud the interior to the outside, i.e. especially not the walls, the floor, and/or the roof of the superstructure. So, under the term furnishing there fall especially kitchen furniture, seating furniture, reclining furniture, beds, cupboards, tables but also wet spaces, shower cabins, toilet cabins, garages, storage boxes etc. that are attached to the superstructure.

The term gross volume in the meaning of the invention should be understood as meaning that it is the product of the base surface of the furnishing multiplied with the maximum height of the furnishing. Here, the base surface should be understood as meaning the surface corresponding to the projection surface of the furnishing seen from the vertical. Here, the volume can also be obtained from the sum of partial volumes of individual furniture and parts of the furnishing.

In this way, the problems that have always been feared with the drives or the statics of the slideouts can be solved with less interventions in the usability of the superstructure than the use of various slideouts regarding the usability of the superstructure do involve. As far as that goes, in clear departure from previous solutions now it is not only possible to provide one slideout that extends at least approximately over the length of the superstructure instead of many small ones, but this against all attempts to date now should be furnished as much as possible. This results in a significantly higher load of the at least one space expansion module, since a large part of the furnishing is specifically provided in the same. In this way, there is created an interior in the superstructure that can be significantly better increased and better practically used. Because, disturbing stationary parts such as for example parts of the outer walls of the superstructure between individual slideouts may be omitted.

Here, it has to be considered that the slideout generally cannot extend completely over the entire length of the superstructure, because the stationary part of the superstructure needs a certain constructive thickness at its edges. As far as that goes, the phrase at least approximately over the entire length of a longitudinal side of the superstructure should be understood as meaning the whole side surface of the superstructure less a possible edge constitution of the stationary part of the superstructure. However, the term can also refer to a maximum available length of a longitudinal side of the superstructure. For example, it may be that the interior formed in the superstructure is only formed in a section along the vehicle longitudinal axis due to the presence of a motor and/or a cooling facility in the rear of the vehicle. In this and in a general case there is meant the longitudinal side of the superstructure less the length along which there is not formed living space in the interior.

Advantageously, the at least one space expansion module further has at least one height that corresponds to at least the 0.8-fold of the maximum headroom of the interior of the superstructure. Here, the headroom refers to the distance between floor and ceiling of the interior; but not to the height obtained for example in places with a dome light or other extensions or fittings formed on the ceiling or the floor. An advantage of this development is the possibility that in an extended state of the at least one space expansion module only slight differences in height at transitions between the superstructure and the space expansion module are present on the floor and/or on the ceiling. Virtually no faults in the floor or in the ceiling of the superstructure occur that noticeably limit usability.

Suitably, the superstructure has a first space expansion module and a second space expansion module arranged opposite thereto. Here, both respectively extend approximately over the entire length and height of a longitudinal side of the superstructure, wherein a part of the furnishing of the superstructure is arranged in both space expansion modules such that at least two thirds of the gross volume of the furnishing of the superstructure are attached to both space expansion modules. An advantage with said arrangement is that with the help of said arrangement most part of the furnishing can be laterally displaced from the center of the superstructure to the outside, which results in a significant gain in space in the center of the vehicle with extended slideouts.

Further, it is of advantage that the furnishing of the superstructure is designed and/or arranged such that a passageway to at least one of a kitchen, shower, toilet, bed and/or bath arranged in the superstructure remains free from furnishing, if the one or all the space expansion modules are completely displaced in the superstructure. In this way it is ensured that also in a state of the at least one space expansion module that is retracted into the stationary part of the superstructure a minimum of accessibility to the present pieces of furniture is maintained. So, the motorhome at least in parts like a conventional motorhome without slideout remains well usable also while driving or in a state with retracted space expansion modules.

Suitably, at least one space expansion module has a maximum depth corresponding to the maximum depth of a kitchen furniture, a bed, and/or a seating furniture. In this way it can be achieved that no step or no projection is present on the floor between the space expansion module and the superstructure that could optically or ergonomically be disadvantageous.

It is further advantageous if at least one space expansion module has a maximum depth that is smaller than the half of the width of the superstructure. Such an arrangement especially permits that the space expansion modules can be arranged opposite to each other such that they each have the same depth and at worst each occupy approximately the half of the available width of the superstructure. Accordingly, with such a development almost a doubling of the usable living space can be achieved with largely balanced statics at the same time.

Advantageously, two space expansion modules arranged opposite in the superstructure are configured such that the sum of the depths of both opposite space expansion modules is smaller than the interior width of the superstructure less a pass-through width preferably of at least 50 cm in width. This development aims at the fact that in the superstructure there is always formed a corridor so that users or passengers of the motorhome can also move through the superstructure when the space expansion modules are retracted into the superstructure. So, passengers for example during the trip can get to parts of the furnishing—such as for example a bed or a toilet—even if it is arranged in the rear part of the vehicle.

A further advantage is that it is possible to attach at least partially parts of the furnishing to the superstructure and/or to the vehicle chassis in this area. Specifically, these may be for example seating furniture with passenger restraint systems.

Suitably, in the superstructure at least one piece of furniture is arranged and configured such that it can be extended and/or displaced transverse to the vehicle longitudinal axis such that it extends at least partially into a space expansion module. An advantage of this development is the integration of flexibly extendable or displaceable furnishing into the interior of the superstructure. This way, the space gained by the space expansion module can be gained either as usable space for a piece of furniture or as additional free space by displacing a piece of furniture.

It is further of advantage that an entry and at least one climbing assistance, kitchen units, a refrigerator, a closet, a bathroom, a toilet, and/or a bed are arranged in or on the first space expansion module. Instead of the bathroom or the toilet also a wet space can be arranged that includes either of them or both components. Also a shower shall be subsumable under the term wet space. A wet space is substantially understood to be a single piece of furniture due to its typically modular, complete design. A wet space comprises at least a water supply and a water discharge device as well as a substantially waterproof sealable wall of the wet space. The term kitchen units in this context gears to at least one kitchen cupboard and/or a worktop, e.g. with a sink unit and/or a hotplate. Nevertheless, the kitchen units can also contain further components, in particular a refrigerator, an oven, a water tank, a boiler, a dishwasher, a washing machine, or a waste bin. Especially the specific combination of the mentioned objects in or on the first space expansion module has proved to be advantageous since in this way a large functionally well fitting part of the furnishing is transferred to the slideout.

According to another development of the invention it is advantageous that in the second space expansion module a closet and at least one seating furniture, a bathroom, a toilet, and/or a bed are arranged. Such a combination of the mentioned objects in the second space expansion module also has proved to be a particularly advantageous functional combination of large parts of the furnishing.

Suitably, the motorhome has at least one bed in a space expansion module that is arranged such that it extends in parallel to the vehicle longitudinal axis in its longitudinal direction and is preferably engineered such that it can be extended transverse to the vehicle longitudinal axis. In this way it can be achieved that the bed in an extended position of the space expansion modules forms the full lying surface, whereby for example an extended aisle or space for further furniture can be achieved. Alternatively, however the bed in its longitudinal direction can also be arranged transverse to the vehicle longitudinal axis in a space expansion module and preferably engineered such that it can be extended transverse to the vehicle longitudinal axis. Nevertheless, it may be of advantage to arrange a not extendable bed in a space expansion module such that it extends transverse to the vehicle longitudinal axis in its longitudinal direction. In this way, the bed for example in a retracted position of the at least one space expansion module can almost completely extend over the entire width of the vehicle chassis, wherein only in the extended state of the space expansion module an aisle of the vehicle longitudinal axis is formed. In general, a bed is understood to be a place to sleep for at least one person, but it is also conceivable that the bed is engineered as a double bed, a bunk bed, or a stretcher, with and without a facility for fixing persons.

It is further of advantage when a bed is arranged in the non-displaceable part of the superstructure such that it extends in parallel to the vehicle longitudinal axis in its longitudinal direction. Then, the bed is extended transverse to the vehicle longitudinal axis, but not transverse to the body axis of the resting person, but in parallel thereto. This reduces disturbing gaps in the lying surface.

Advantageously, in at least one space expansion module of the motorhome as a seating furniture a bench is arranged and configured such that this is at least partially pivotable about a horizontal pivot axis. One advantage of this arrangement is that in the extended state of the at least one space expansion module either a gain in usable living space can be obtained, or the space extended transverse to the vehicle longitudinal axis can be used as an extended seating.

Suitably, at least under a part of a seating furniture of the motorhome a seat belt anchorage is attached to a supporting member of the motorhome to which at least one restraint system for at least one passenger is arranged. So, the seating furniture can be used as passenger seat while driving.

Moreover, it is suitable that a dinette is arranged in the non-displaceable part of the superstructure of the motorhome that in its longitudinal axis extends transverse to the vehicle longitudinal axis that is preferably configured displaceable, pivotable and/or height-adjustable. In analogy to the seating furniture by such an arrangement a flexible and space-optimized use of the interior of the motorhome can be achieved. Here, the term dinette especially gears to a group of furniture comprising at least one piece of seating furniture that is arranged beside and/or at least partially around a table. Here, the seating furniture and/or the table can be configured adjustable, displaceable, and/or foldable such that a seat with table, a seat without a table, or a lying surface can be generated.

Advantageously, a storage box accessible from the outside is arranged in one space expansion module of the motorhome, preferably under a bed. Again, the term storage box is meant to be broad. This can be an arbitrary storage space. So, it is also understood to mean a garage for a vehicle, for example a small car, a bicycle, or a jet ski, or a snowmobile. By the arrangement according to the invention it is ensured that an object placed in the space expansion module is always accessible from the outside of the motorhome. For example, a garage can be configured such that an access to the storage box is only possible in an extended state of the space expansion module. However, it is also possible to design the storage box or the garage such that parking in and out is possible both in the retracted and the extended state of the space expansion module.

It is further advantageous that in the non-displaceable part of the superstructure of the motorhome at least one wall element is arranged that is telescopic and/or foldable with respect to its width and which is preferably attached to the superstructure such that it can be pivoted at least in two parts about a vertical pivot axis. In this way, it is ensured that independent of the position of the space expansion module a wall can be created. Here, the wall element can preferably be formed transverse to the vehicle longitudinal axis and completely or partially extend over the entire cross section of the motorhome.

Advantageously, in the non-displaceable part of the superstructure of the motorhome a bed configured as a double bed is arranged, wherein the bed is preferably arranged symmetrically to the vehicle longitudinal axis and in the rear part of the superstructure in the direction of travel of the motorhome. In this way, the double bed can be used both in the retracted and in the extended state of the space expansion modules.

Moreover, it is suitable that the bed configured as a double bed is configured such that it protrudes at least partially into at least one space expansion module when this is completely pushed into the superstructure or when the space expansion modules are pushed into the superstructure. So, even with a relatively broad bed there still results a good use of space, wherein the closets arranged on the longitudinal walls of the slideouts are formed such that their depths in the area of the mattress and the lying surface above is about half as deep than below and above. (The substructure of the bed is narrower by ca. 50 cm than the mattress and the slatted frame).

Advantageously, a bathroom is arranged in the non-displaceable part of the superstructure of the motorhome, wherein the bathroom is preferably arranged symmetrically to the vehicle longitudinal axis and in the rear part of the superstructure in the direction of travel of the motorhome.

Suitably, at least a refrigerator, a sink and a cooker are arranged in the kitchen unit of the motorhome. These objects constitute the core elements of what is commonly referred to as the kitchen.

It is further of advantage that at least one space expansion module has at least one movably, displaceably and/or telescopically configured supply and/or disposal line. By the presence of said components it is ensured that various media streams can be exchanged between the vehicle chassis and the at least one space expansion module. The term supply and/or disposal line particularly gears to water-supply lines, gas-supply lines, and/or electric lines. Advantageously, at least one space expansion module of the motorhome has at least one supply and/or disposal line that is arranged such that it extends at least in the area of a floor of the space expansion module outside the space expansion module. The arrangement of the supply and/or disposal line outside the space expansion module makes it possible to arrange the line without disturbing the interior, but also to maintain the supply and/or disposal line in a simple manner.

Moreover, it is suitable that at least one space expansion module has a tank. Here, the term tank gears to a storage container for stocking up solid, liquid, and/or gaseous media. Here, the tank can arbitrarily be attached to, in, on, or under the space expansion module.

It is advantageous to displaceably attach a climbing assistance via a guide to the vehicle chassis and/or to the superstructure and preferably configure it as fold-out stairs. The climbing assistance can have a step-, ramp- and/or ladder-like structure that is movably and/or stationary arranged on or in the motorhome. Suitably, the climbing assistance is arranged below a door or an access opening to the interior of the superstructure, whereby it is possible to enter or leave the interior of the motorhome via the first space expansion module.

Advantageously, at least one sliding bearing for slidingly supporting the space expansion module is arranged between the stationary part of the superstructure and a space expansion module that preferably has a sliding member of a sliding material, especially PTFE, that interacts with an opposite sliding surface. The sliding material is understood to be a material that in combination with the sliding surface causes a reduction in friction. The sliding surface advantageously is made of an abrasion-resistant material, in particular a metallic material. It is particularly advantageous to configure the sliding surface of stainless steel that is weather-resistant and ensures a permanently abrasion-resistant sliding surface. Further, the sliding member can be configured as a rolling member that rolls on the sliding surface.

Suitably, at least one roller bearing for supporting the space expansion module is arranged between the stationary part of the superstructure and a space expansion module. This is of advantage in that the underlying floor of the stationary part of the superstructure is treated with care by the rolling. Especially, if the floor is a scratch-sensitive floor this configuration of the bearing makes sense. Here, it is suitable to distribute the pressure if possible along the whole edge of the space expansion module. This can be done with a very broad but also with a lot of small rollers. It is also practical to match a property of the material of the roller (e.g. hard or soft roller) to the floor conditions of the floor of the stationary part of the superstructure. This with the aim to avoid dents or running marks in the floor as far as possible.

Advantageously, at least in certain areas a mudguard and a seal, preferably an inflatable seal are arranged between the stationary part of the superstructure and a space expansion module. Here, the seal is arranged between the mudguard and the interior. This two-stage sealing of the interior from outer influences, especially dirt, moisture and heat, results in a reliable sealing system. In this context, the term mudguard represents a touching seal, especially a sealing lip that is configured such that dirt such as for example leaves or sand do not reach the actual sealing behind. Here, it is conceivable to use an elastic sealing lip of a flexible material such as for example gum or the like. Alternatively, also a brush-like structure can be employed.

The inflatable seal (the term has to be understood as being broad and is intended to also include seals that are relieved by vacuum during moving the space expansion modules) can preferably be configured as a circumferential seal, wherein at least the two lateral gaps and the roof gap are sealed by the circumferential seal. However, it is also conceivable to use single sealing segments dividing the total length of the gaps into individual sealing segments. Further, it is also possible to configure the seal as a rigid member that is attached either to the space expansion module or to the non-displaceable part of the superstructure of the motorhome. Also, the mudguard can be attached either to the space expansion module or to the non-displaceable part of the superstructure of the motorhome. Here, it is irrelevant whether the relative motion of the mudguard and the seal are attached to a common component or whether for example the inner seal is attached to the space expansion module and the outer mudguard is attached to the non-displaceable part of the superstructure. It should be noted that the inflatable seal generally is only inflated in the end positions of the slideouts.

Moreover, it is suitable to arrange the first and the second space expansion modules symmetrically to the vehicle longitudinal axis in the superstructure. With the help of this arrangement it can be ensured that in the extended state of the space expansion modules an approximately balanced statics of the parked motorhome can be achieved. The term symmetrically to the vehicle longitudinal axis substantially refers to the depth of the space expansion modules. Accordingly, it is not mandatory that the space expansion modules that are symmetrically arranged to the vehicle longitudinal axis in the superstructure as such are configured in mirror symmetry to each other. The extension of the space expansion module in height and length of the lateral surface of the motorhome can be different.

It is further of advantage to attach at least one drive to the superstructure that is symmetrically to the vehicle longitudinal axis and configured such that it can move two space expansion modules at the same time transverse to the vehicle longitudinal axis. Optionally, here by means of a transmission unit it can be chosen whether one or both or more space expansion modules are moved at the same time or sequentially. Here, it is important that one motor each is present per drive, whereby the complexity of the total system can be reduced. In a particularly preferred development of the invention four drives in total are present in the immobile part of the superstructure in the corners of two opposite space expansion modules that are mirror-symmetrically to a vertical vehicle center axis. According to this development said drive permits a simultaneous or sequential force application into the opposite corners of two space expansion modules.

BRIEF DESCRIPTION OF THE DRAWINGS

In the following the invention is explained in detail with reference to examples shown in the drawings. Here:

FIG. 9.1 schematically shows a cross section of a superstructure orthogonal to the vehicle longitudinal axis with retracted space expansion modules;

FIG. 9.2 schematically shows the area A shown in FIG. 9.1 in an enlarged view;

FIG. 9.3 schematically shows the area B shown in FIG. 9.1 in an enlarged view;

FIG. 9.4 schematically shows the area C shown in FIG. 9.1 in an enlarged view;

FIG. 10.1 schematically shows a cross section of a superstructure orthogonal to the vehicle longitudinal axis with extended space expansion modules;

FIG. 10.2 schematically shows the area A shown in FIG. 10.1 in an enlarged view;

FIG. 10.3 schematically shows the area B shown in FIG. 10.1 in an enlarged view;

FIG. 10.4 schematically shows the area C shown in FIG. 10.1 in an enlarged view;

DETAILED DESCRIPTION

Figure 1:
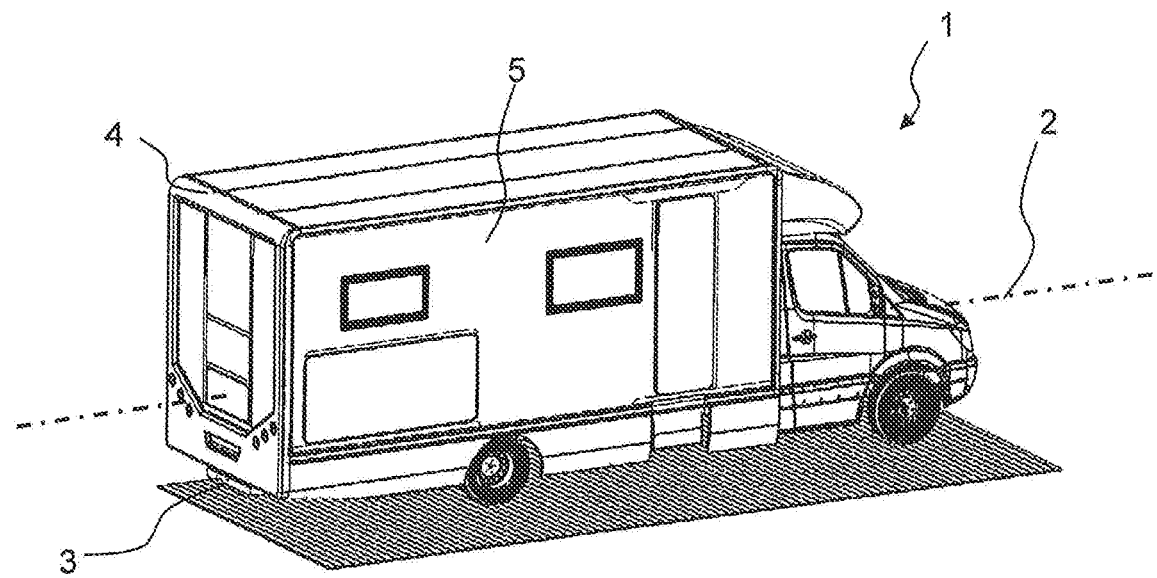
FIG. 1 schematically shows a perspective view of a first example of a motorhome according to the invention with a retracted space expansion module.

FIG. 1 shows a motorhome 1 according to the invention by means of a perspective view. It has a vehicle longitudinal axis 2 and a vehicle chassis 3 onto which a superstructure 4 is built that extends in the vehicle longitudinal axis 2. The superstructure 4 has a space expansion module 5 at its side that is attached to the stationary part of the superstructure 4 displaceably transverse to the vehicle longitudinal axis 2. The space expansion module 5 in the example shown extends at least approximately over the entire length and height of a longitudinal side of the superstructure 4 of the motorhome 1.

Figure 2:
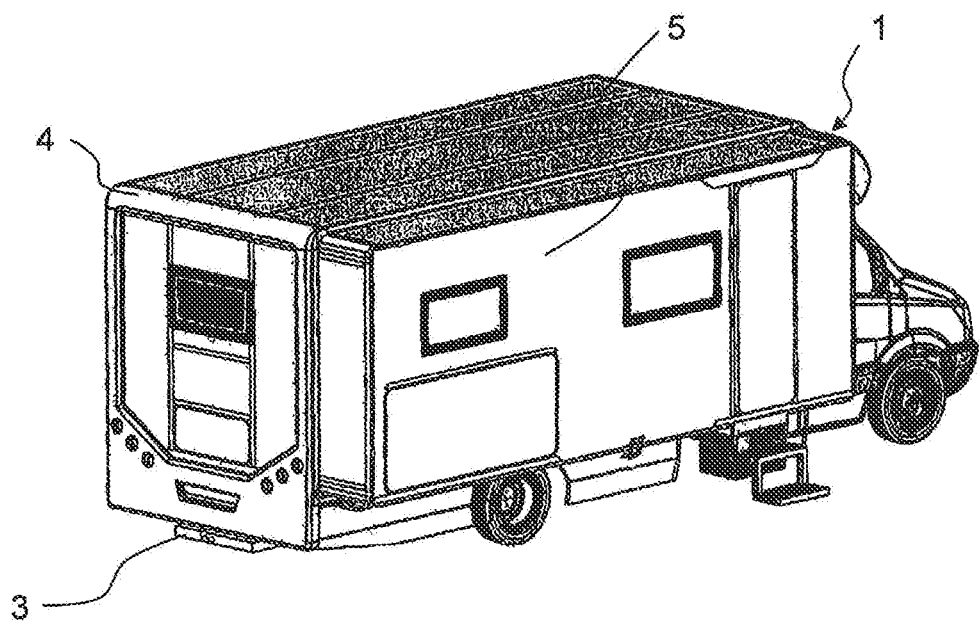
FIG. 2 schematically shows a perspective view of the motorhome shown in FIG. 1 with an extended space expansion module.

In the state illustrated in FIG. 1 the space expansion module 5 is in a retracted position. An extended position of the space expansion module 5 is illustrated in FIG. 2.

Figure 3:
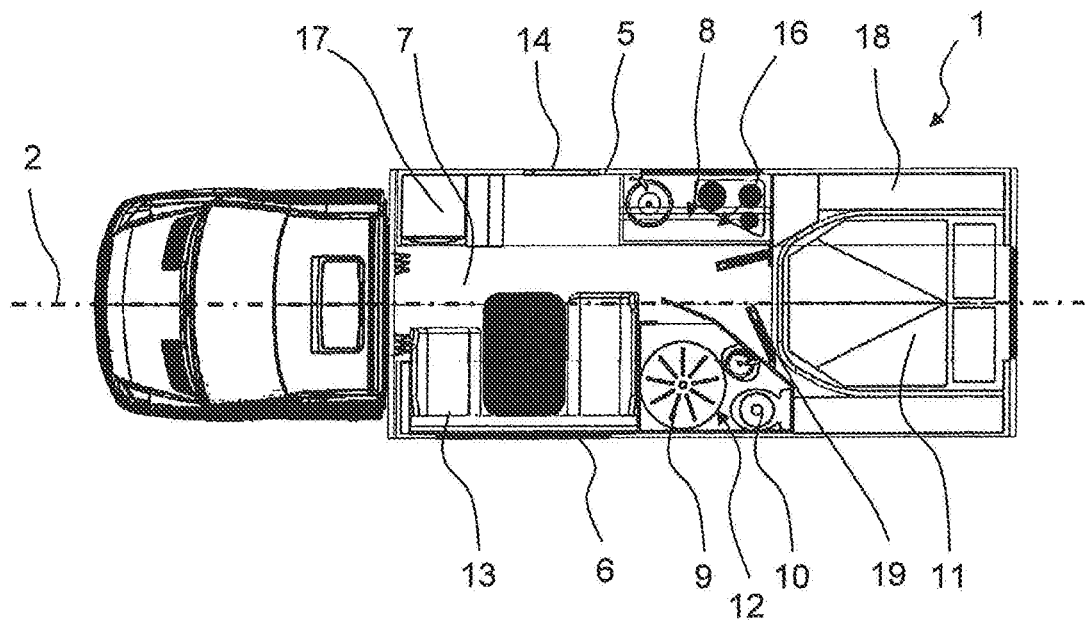
FIG. 3 schematically shows a horizontal longitudinal section through the superstructure of the motorhome shown in FIG. 1 with a retracted space expansion module.
Figure 4:
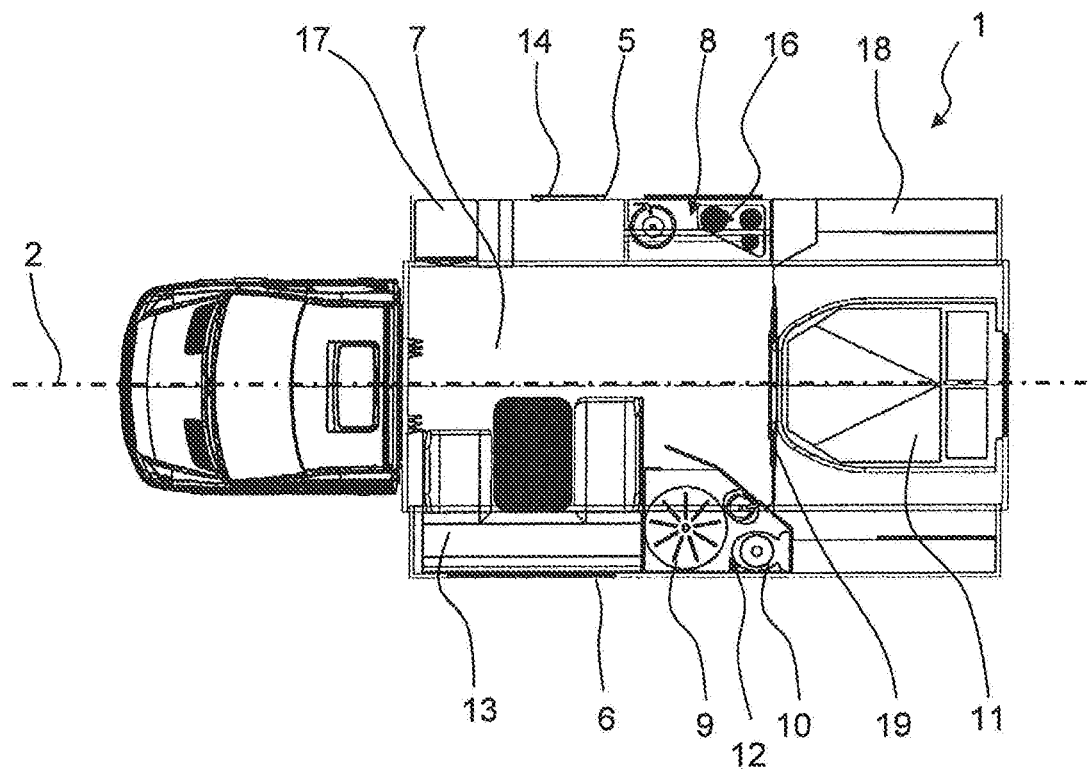
FIG. 4 schematically shows the horizontal longitudinal section shown in FIG. 3 with extended space expansion modules.

The interior of the first example of a motorhome according to the invention is illustrated in FIG. 3 and FIG. 4. There is shown a horizontal longitudinal section through the superstructure 4 of the motorhome 1. The motorhome 1 in addition to the first space expansion module 5 has an opposite second space expansion module 6. Both space expansion modules 5 and 6 are configured in mirror symmetry to the vehicle center.

As can be seen from FIG. 3, there is still present a passageway 7 in the retracted state of the space expansion modules 5 and 6 that permits access at least to parts of the furnishing. So, in the retracted state of the space expansion modules 5 and 6 for example the kitchen 8, the shower 9, the toilet 10, and/or the bed 11 can be reached. In the example shown the shower 9 and the toilet 10 are combined in a bathroom 12.

According to the invention a large part, in this case even the predominant part of the furnishing is attached within the space expansion modules 5 and 6. In the embodiment shown the depth of the space expansion modules corresponds to the structure-related extension in depth of the kitchen furniture that are part of the kitchen 8. Accordingly, in an extended state of the space expansion modules 5 and 6 the kitchen 8 is completely displaced transverse to the vehicle longitudinal axis to the outside, whereby the passageway 7 in the interior of the superstructure 4 significantly increases. The sum of the depths of the space expansion modules 5 and 6 in the embodiment shown is smaller than the width of the superstructure 4 of the motorhome 1. So it is ensured that in the retracted state of the space expansion modules 5 and 6 a passageway 7 having a width of at least 50 cm is present.

In the second space expansion module 6 a seating furniture 13 is arranged transverse to the vehicle longitudinal axis that both can be displaced with the space expansion module 6 to the outside and extended transverse to the vehicle longitudinal axis 2.

The furnishing in the example shown is divided as follows. In the first space expansion module 5 there are arranged an entry 14 and a not illustrated climbing assistance 15, a kitchen unit 16, a refrigerator 17, and a closet 18. In the second space expansion module 6 there are arranged a closet 18, a seating furniture 13 and a wet space 12 that is arranged in the slideout 6 but protrudes into the stationary superstructure. Moreover, in the rear part of the vehicle a non-displaceable bed 11 is arranged in parallel to and along the vehicle longitudinal axis 2. The bed 11 configured as a double bed in a retracted state of the space expansion modules 5 and 6 partially protrudes into them.

Moreover, the embodiment illustrated in FIG. 3 and FIG. 4 has two telescopic wall elements 19 that are configured as two pieces. The telescopic guide permits to adapt the wall surfaces transverse to the vehicle longitudinal axis 2. This is particularly useful to form a wall between the stationary part of the superstructure 4 and the space expansion modules 5 and 6 in the extended state of the space expansion modules 5 and 6. Moreover, the wall element 19 in the retracted state can be pivoted about a vertical axis, wherein the wall element 19 is attached to the non-displaceable part of the superstructure.

Figure 5:
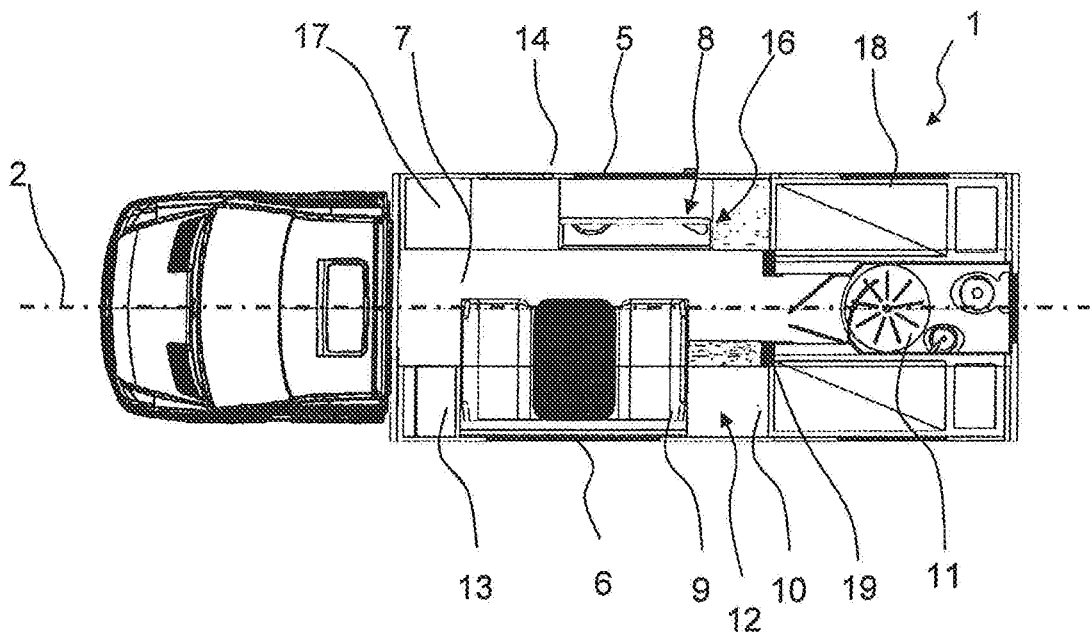
FIG. 5 schematically shows a horizontal longitudinal section through the superstructure of a motorhome according to the invention in accordance with a second embodiment with retracted space expansion modules.

A second embodiment of the motorhome 1 according to the invention is shown in FIG. 5 and FIG. 6 again as a horizontal longitudinal section. The motorhome 1 again has two space expansion modules 5 and 6 that are both configured symmetrically to the vehicle longitudinal axis. Also here again a predominant part of the furnishing is arranged inside the space expansion modules 5 and 6. As in the first embodiment also here by a practical arrangement of the furniture and design of the slideouts 5, 6 a passageway 7 is formed that permits access to essential parts of the furnishing.

In the second embodiment the depth of the space expansion modules 5, 6 corresponds to the depth of the furniture that are part of the kitchen 8. Accordingly, in the extended state of the space expansion modules 5 and 6 the kitchen 8 is completely displaced transverse to the vehicle longitudinal axis to the outside, whereby the passageway 7 in the interior of the superstructure 4 significantly increases. The sum of the depths of the space expansion modules 5 and 6 in the embodiment shown is smaller than the width of the superstructure 4 of the motorhome 1. So, it is ensured again that in the retracted state of the space expansion modules 5 and 6 a passageway 7 having a width of at least 50 cm is present.

In the second space expansion module 6 a seating furniture 13 is arranged that is oriented transverse to the vehicle longitudinal axis and both can be displaced with the space expansion module 6 to the outside, but also extended transverse to the vehicle longitudinal axis 2. The furnishing in the example shown is divided as follows:

In the first space expansion module 5 there are arranged an entry 14 and a not illustrated climbing assistance 15, a kitchen unit 16, a refrigerator 17 and a bed 11.

In the second space expansion module 6 there are arranged a closet 18 or kitchen cupboard 19, a seating furniture 13 and a second bed 11. Moreover, in the rear part of the vehicle a non-displaceable bathroom 12 is arranged in parallel to and along the vehicle longitudinal axis 2.

Both beds 11 each are attached in the space expansion modules 5 and 6, wherein the bed 11 of the first space expansion module 5 can be extended as a double bed transverse to the vehicle longitudinal axis.

Figure 6:
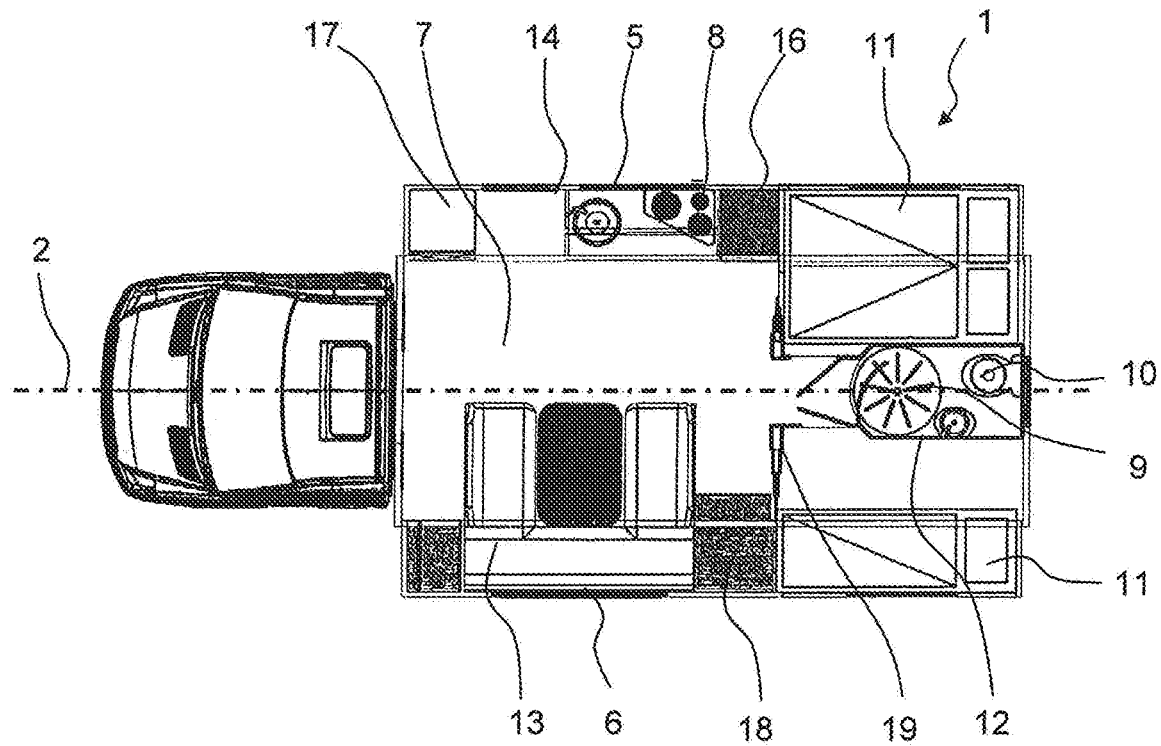
FIG. 6 schematically shows the horizontal longitudinal section shown in FIG. 5 with extended space expansion modules.

Moreover, the embodiment illustrated in FIG. 5 and FIG. 6 has a telescopic wall element 19, wherein the telescopic guide permits an adaption of the wall surface in a direction transverse to the vehicle longitudinal axis 2. This is particularly useful to achieve a closed-surface wall in the extended state of the space expansion modules 5 and 6. Moreover, the wall element 19 in the retracted state can be pivoted about a vertical axis, wherein the wall element 19 is attached to the non-displaceable part of the superstructure 4.

Figure 7:
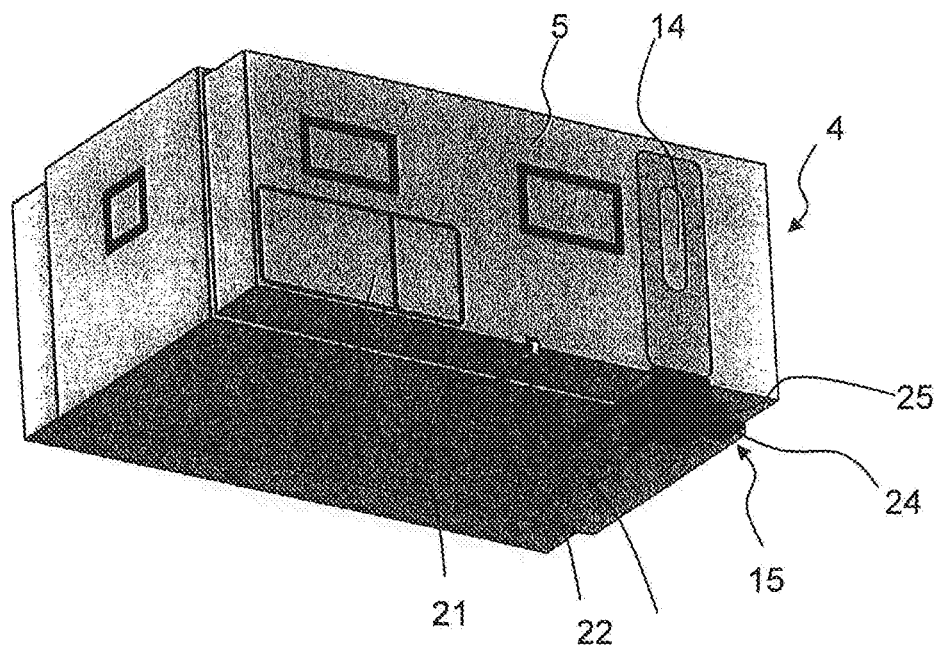
FIG. 7 schematically shows a perspective exterior view of a superstructure for a motorhome according to the invention with extended space expansion modules seen from diagonally below.

FIG. 7 shows a perspective exterior view of a superstructure 4 for a motorhome 1 according to the invention with extended space expansion modules 5 and 6. On the first space expansion module 5 a climbing assistance 15 having a guide 20 is displaceably attached to the vehicle chassis 3 and to the superstructure 4. In the example shown in FIG. 7 the climbing assistance is configured as fold-out stairs. Further, on the outer wall of the space expansion module an entry 14 and a storage box 21 are provided. In the embodiment shown in FIG. 7 the storage box is configured as a garage that is accessible from the outside and extends below the not illustrated bed 11 in the interior.

Moreover, a flexible supply and disposal line 22 is arranged extending on the floor outside of the first space expansion module 5 which establishes a connection by means of a profile 23 to the kitchen 8. In the supply line, on the one hand, wastewater from the kitchen can be drained away and on the other hand fresh water from a not illustrated tank 24 can be supplied. In a further not illustrated embodiment the supply or disposal line 22 is configured displaceable and/or telescopic.

Figure 8:
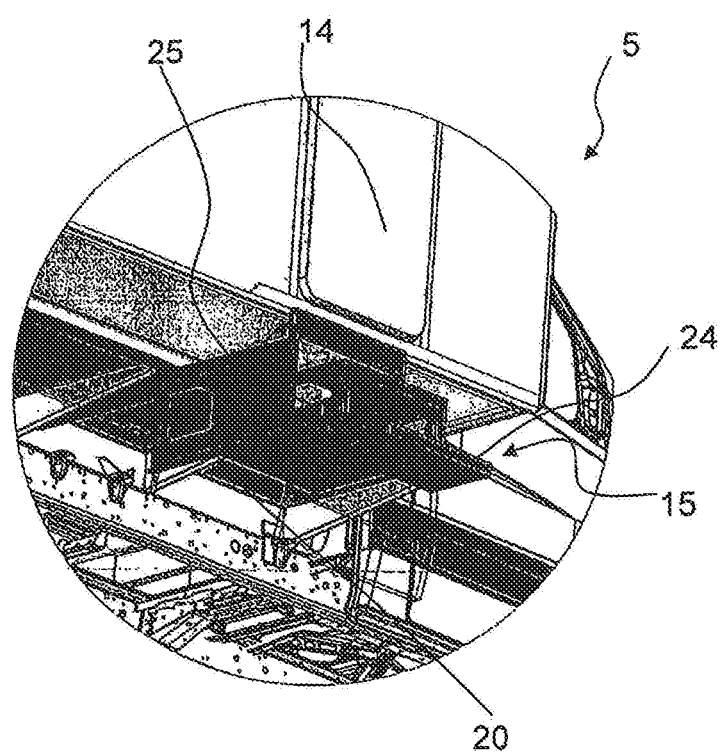
FIG. 8 schematically shows a detailed view of a climbing assistance according to the invention.

The climbing assistance 15 in the embodiment shown in FIG. 8 is configured as fold-out stairs 24. The stairs 24 together with the stair box 25 are attached outside to the space expansion module 5 and are guided over a guide 21 along the chassis 3 of the superstructure 4.

FIGS. 9.1 to 9.4 schematically show a cross section through the superstructure 4 orthogonal to the vehicle longitudinal axis 2 with retracted space expansion modules 5 and 6. Here, FIG. 9.1 represents an overview with three marked areas A, B and C that each are illustrated enlarged in the figures, FIG. 9.2 (area A), FIG. 9.3 (area B) and FIG. 9.4 (area C).

In analogy to the representations of FIGS. 9.1 to 9.4, FIGS. 10.1 to 10.4 show the same cross section of the superstructure 4, but with extended space expansion modules 5 and 6. Areas A, B and C are identical to the areas of the FIGS. 9.1 to 9.4, however due to the relatively moved space expansion modules 5 and 6 other components become visible.

FIG. 9.2 with area A shows a central portion of the roof of the stationary part of the superstructure 4 to the inside of which the roof of the space expansion module 5 fits. In the retracted state of the space expansion module 5 illustrated in FIG. 9.2 in area A the circumferential inner edge 26 of the space expansion module 5 can be seen. Between the circumferential inner edge 26 and the roof of the superstructure 4 a sliding bearing for slidingly supporting the space expansion module 5 is arranged in the stationary part of the superstructure 4. The sliding bearing among others comprises a moved sliding member 27 that is attached to the space expansion module 5 and that slides on a stationary sliding surface 28 that is formed on the stationary part of the superstructure 4. In the example shown the sliding member 27 composed for example of PTFE slides on a surface-treated stainless steel sliding surface 28. A stopping device 30 that is attached to the stationary part of the superstructure 4 and forms an abutment for the circumferential inner edge of the space expansion module 5 serves to limit the relative motion in the retracting direction 29. FIG. 10.2 shows the area A in an extended position of the space expansion module 5.

FIG. 9.3 with area B shows an outer portion of the roof of the stationary part of the superstructure 4 to the inside of which the roof of the space expansion module 5 fits. In area B the sliding bearing has an additional stationary sliding member 31 located on the stationary part of the superstructure 4 that serves as an abutment for an extending direction 32 at the same time. The stationary sliding member 31 slides on a sliding surface 33 formed on a circumferential inner side 26 of the space expansion module 5.

Accordingly, the sliding bearing is substantially composed of a stationary sliding surface 28 on which a sliding member 27 slides and a stationary sliding member 31 that slides on a sliding surface 33. The stationary components are attached to the stationary part of the superstructure 4, the moved components to the adjacent space expansion module.

In the embodiment shown the moved sliding member 27 has a cross section that becomes conically broader toward the sliding surface and is held by a Y profile at the space expansion element 5. The stationary sliding member 31 has a bevel that is complementary to the bevel of the moved sliding member 27 and attached on an inner side of the stationary part of the space expansion module 5. FIG. 10.3 illustrates the engagement of the movable sliding element 27 with the stationary sliding element 33, whereby the maximum extending position of the space expansion module 5 is defined.

In area B between the sliding bearing and the vicinity a mudguard 34 and a seal 35 are formed. In the embodiment shown the mudguard 34 and the seal 35 together with the stationary sliding element 31 are attached to the inner side of the stationary part of the space expansion module 5. The mudguard 34 substantially forms an elastic mud lip 36 that lies on the moved sliding surface 33 with an appropriate biasing for an extended state of the space expansion module 5. Spatially inside behind the mudguard there is located the seal 35 that is configured as an inflatable, circumferential seal in the example shown.

FIG. 9.2 with area C shows an outer portion of the floor of the stationary part of the superstructure 4 along which the floor of the space expansion module 5 is retracted and extended. The circumferential components illustrated in FIG. 9.2, mudguard 34 and seal 35, in area C abut to a rolling surface 37 that is also formed on a stationary area of the superstructure 4. In FIG. 10.4 illustrating the extended state of the space expansion element 5 there is located a rolling member 38 of a roller bearing 39 immediately, but without contact to a stop bar 40 that abuts to the seal 35.

In the previous embodiments it was exemplarily dealt with the first space expansion module 5. The described features further also apply to the second and further space expansion modules.

Figure 11:
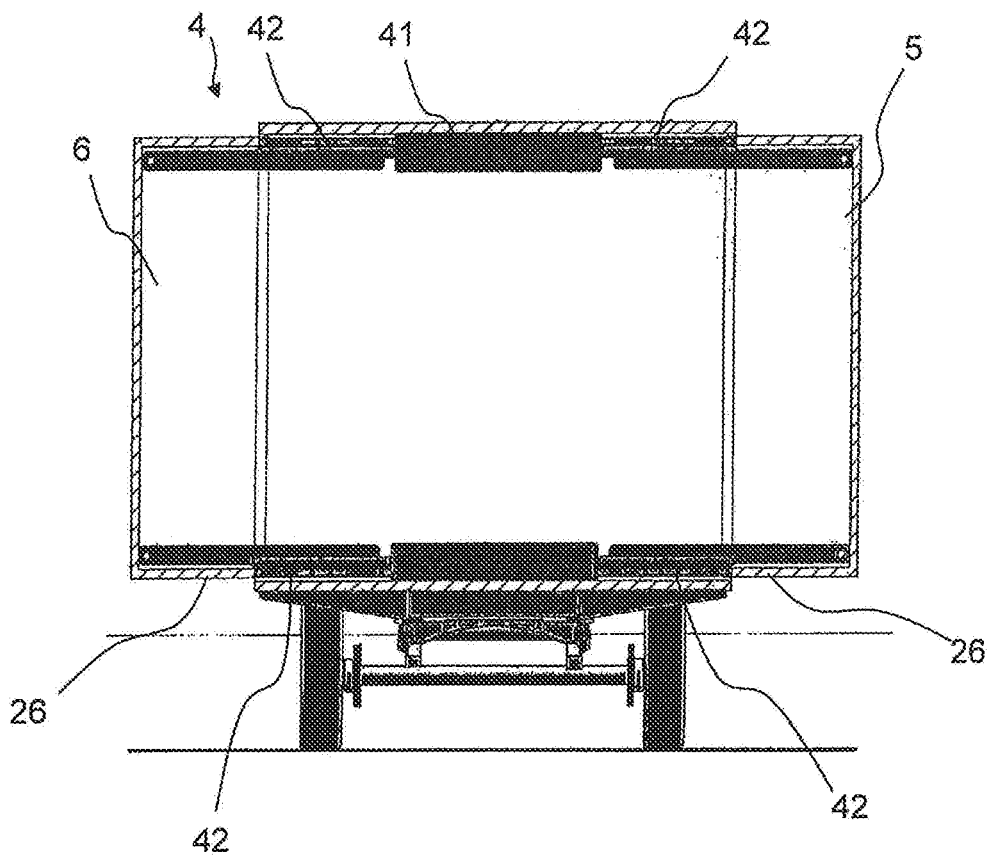
FIG. 11 schematically shows an enlarged view of FIG. 10.1.

FIG. 11 shows an enlarged view of the cross section according to FIG. 10.1. To realize the retracting and extending movement of the space expansion modules 5 and 6 a drive 41 is provided that is configured as a spindle drive in the case shown. The relative movement of the space expansion modules 5 and 6 takes place via guiding elements 42 that are displaceably connected to the stationary part of the superstructure 4. In the embodiment shown, the drive 41 and the guiding elements 42 are configured as an assembly that is arranged in the interior of the superstructure 4.

Four individual assemblies in total for moving the space expansion modules 5, 6 are provided, wherein the assemblies each are attached in the corners of the space expansion modules 5 and 6. By triggering the individual assemblies separately and controlled with distance sensors jamming of the space expansion modules 5 and 6 with the stationary part of the superstructure 4 can be prevented.

FIG. 12 again shows an enlarged partial illustration of the view according to FIG. 9.1. There are illustrated the two areas A and B, but in a sectional plane that additionally depicts the drive 41. There is shown the superstructure 4 with a retracted space expansion module 5. Here, the drive 41 is configured as a spindle drive that is attached to a drive seat 43 on the stationary part of the superstructure. Further, the drive 41 comprises an electric motor 44 that moves a spindle 46 via a transmission unit 45. The spindle 46 together with a guide tube 47 forms a telescopic lance 48 that is attached to the space expansion module 5 by means of an anchoring sheet 49, here referred to as holding blade. In the embodiment shown, the drive 41 is configured in a corner of the superstructure 4, whereby the loss of space by the described components for retracting and extending the space expansion module 5 is kept to a minimum.

Figure 12:
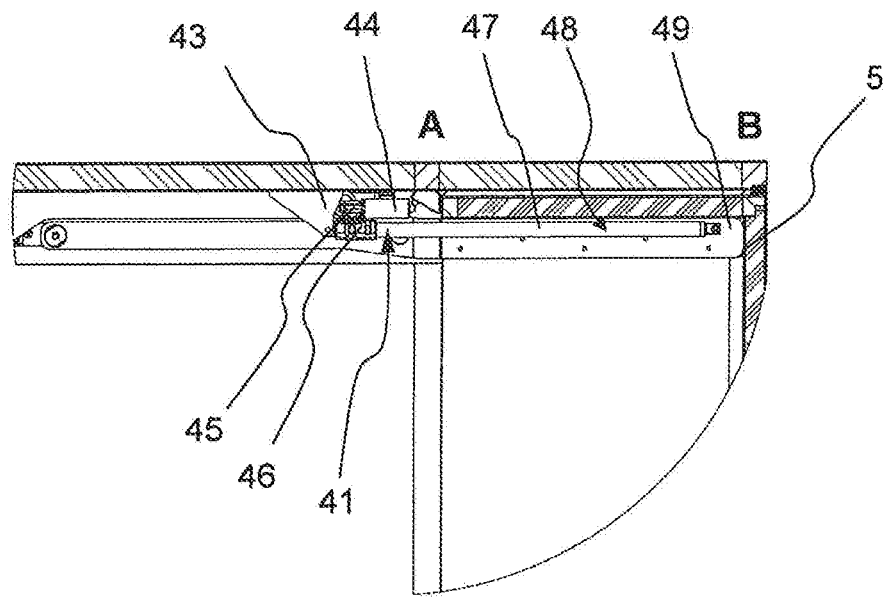
FIG. 12 schematically shows areas A and B shown in FIG. 9.1 in an enlarged view with a drive unit.
Figure 13:
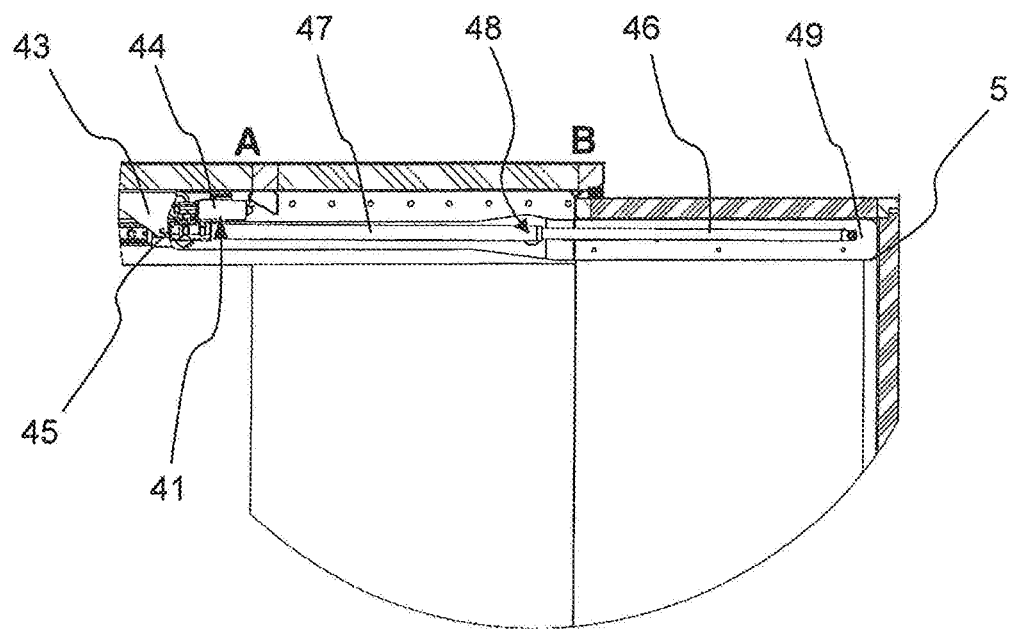
FIG. 13 schematically shows areas A and B shown in FIG. 10.1 in an enlarged view with a drive unit.
Figure 14:
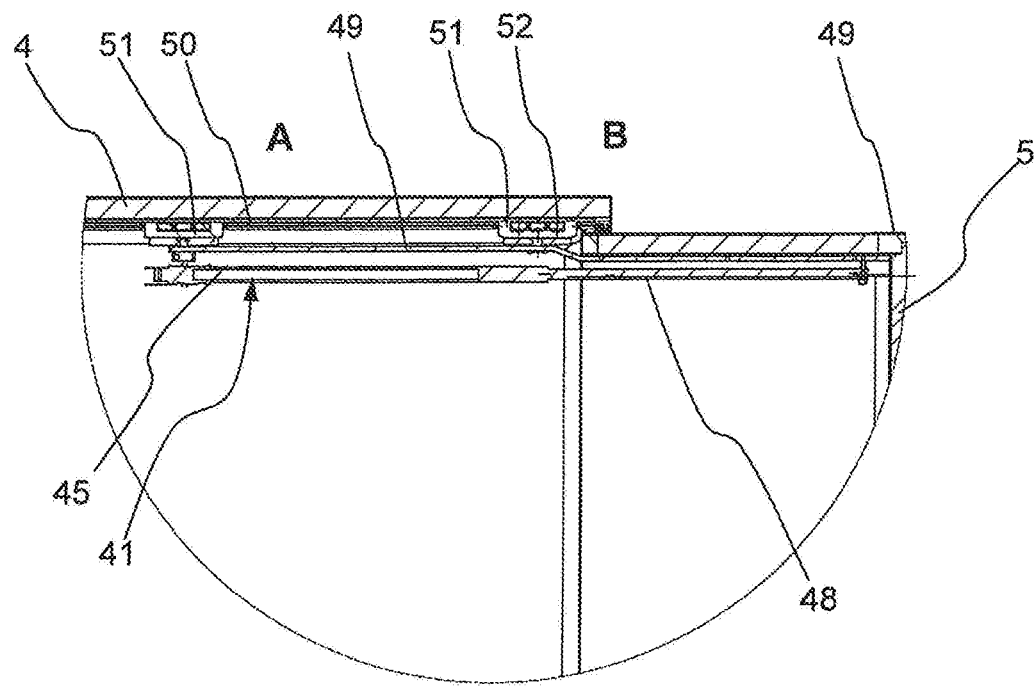
FIG. 14 schematically shows a section through the drive unit shown in FIG. 13.

FIG. 13 and FIG. 14 show the identical area of the superstructure as FIG. 12, but with the extended space expansion module 5. These illustrations particularly explain how the spindle 46 together with the guide tube 47 forms the telescopic lance 48. The spindle 46 extends inside the guide tube 47 up to the transmission unit 45 that meshes with the spindle 46 via a toothing.

As is especially apparent from the sectional view in FIG. 14, the guiding element 49 has a guide rail 50 to which the holding blade is displaceably attached via two slides 51. The slides 51 each have three rollers to introduce the forces into the guide rails 50 at lower friction.

Figure 15:
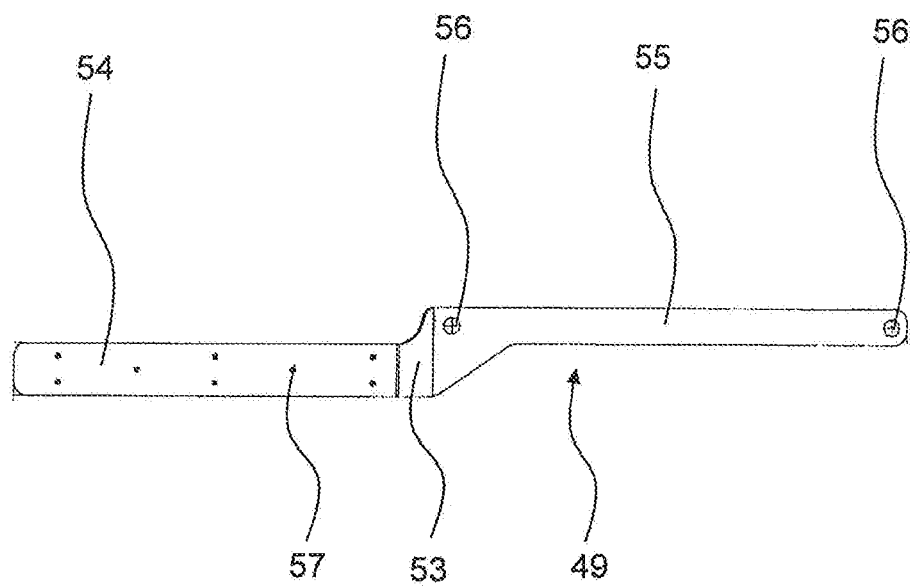
FIG. 15 schematically shows an example of a holding blade.

As is apparent from the illustrations in FIG. 14 and FIG. 15, the holding blade 49 preferably has a throw 53. Said protrusion causes that the holding blade with its holding area 54 can lie flat on the slideout 5 and despite its slim design has a high load-bearing strength at low weight. Also, the space required is very low and due to the screw holes 57 distributed over the entire surface of the holding area 54 the holding blade is set flat on the wall of the slideout 5.

On the other side of the throw 53 there is the holding area 55 with two larger holes 56 for attaching the slides 51. Here, the holes are so large in order to be able to insert eccentrics into them via which the installation position of the holding blade 49 or of the slideout 5, respectively, attached thereto can be finely adjusted.

REFERENCE SYMBOLS 1. motorhome
2. vehicle longitudinal axis
3. chassis
4. superstructure
5. first space expansion module
6. second space expansion module
7. passageway
8. kitchen
9. shower
10. toilet
11. bed
12. bath
13. seating furniture
14. entry
15. climbing assistance
16. kitchen unit
17. refrigerator
18. closet
19. wall element
20. guide
21. storage box
22. supply and disposal line
23. profile
24. stairs
25. stair box
26. circumferential inner edge
27. moved sliding member
28. stationary sliding surface
29. retracting direction
30. stopping device
31. stationary sliding member
32. extending direction
33. moved sliding surface
34. mudguard
35. seal
36. mud lip
37. rolling surface
38. rolling body
39. rolling bearing
40. stop bar
41. drive
42. guide elements 43. drive seat
44. electric motor
45. transmission unit
46. spindle
47. guide tube
48. telescopic lance
49. anchoring sheet or holding blade
50. guide rail
51. slide
52. roller in the slide
53. throw
54. attachment area for slideout
55. attachment area for slide
56. eccentric hole
57. screw hole

The invention claimed is:

1. A motorhome comprising a vehicle longitudinal axis and a superstructure that is arranged on the vehicle chassis and extends in the vehicle longitudinal axis, wherein the superstructure has at least one space expansion module that is displaceably attached to it transverse to the vehicle longitudinal axis and extends at least approximately along the entire length and height of a longitudinal side of the superstructure, wherein at least four drives for moving the at least one space expansion module transverse to the vehicle longitudinal axis are arranged with a drive of the at least four drives being disposed at each of the at least four respective corners on the superstructure or on a space expansion module and that at least one driver is configured as a spindle drive, wherein the at least one space expansion module is displaceably connected to the superstructure via at least four guiding elements each and a guiding element each has a guide rail with at least one slide moveably attached thereto and a holding blade attached to the slide and the slide and the holding blade are connected by interposing one adjusting means.

2. The motorhome according to claim 1, wherein
at least two drives and guiding elements each are arranged in the floor area and at least two drives and guiding elements each are arranged on top of the front and rear walls, respectively.

3. The motorhome according to claim 1, wherein
the drives are electronically synchronized and preferably have a load-controlled emergency cut-out.

4. The motorhome according to claim 1, wherein
the drives assigned to a space expansion module have a driving power that in total is at most as large that the movement of the space expansion module can be performed manually, preferably using a mechanical emergency actuation aid.

5. The motorhome according to claim 1, wherein
at least one guide rail is directly attached to a ceiling, a wall, or a floor of the superstructure.

6. The motorhome according to claim 1,
wherein at least one holding blade is directly attached to a ceiling, a wall, or a floor of a space expansion module.

7. The motorhome according to claim 1, wherein
a foamed plastic of increased strength is arranged in the concerned ceiling, wall, or floor of the superstructure or of the space expansion module in the area of attachment of the guide rail or of the holding blade.

8. The motorhome according to claim 1, wherein
at least one slide has at least two rolling members via which it is connected to the guide rail.

9. The motorhome according to claim 1, wherein
the slide and the holding blade are connected by interposing one adjusting means configured as an eccentric.

10. The motorhome according to claim 1, wherein
at least one holding blade has a throw.

11. The motorhome according to claim 1, wherein
at least one force application means absorbing tensile and/or compressive forces is provided on the superstructure and on at least one space expansion module for applying the force of a mechanical emergency actuation means, especially a tension-compression device.

12. The motorhome according to claim 1, wherein
the drives and the guiding elements are arranged in the interior of the superstructure or the at least one space expansion module, respectively.

13. The motorhome according to claim 1, wherein
a drive and a guiding element each are combined in a driving and suspension assembly.

14. The motorhome according to claim 1, wherein
between the stationary part of the superstructure and a space expansion module at least one sliding bearing for slidingly supporting the space expansion module is arranged that preferably has a sliding member of a sliding material, especially PTFE, that interacts with an opposite sliding surface.

15. The motorhome according to claim 1, wherein
between the stationary part of the superstructure and a space expansion module at least one roller bearing for rollingly supporting the space expansion module is arranged.

* * * * *